(12) United States Patent
Dinnage et al.

(10) Patent No.: US 7,101,414 B2
(45) Date of Patent: Sep. 5, 2006

(54) ROTARY BED SORPTION SYSTEM INCLUDING AT LEAST ONE RECYCLED ISOLATION LOOP, AND METHODS OF DESIGNING AND OPERATING SUCH A SYSTEM

(75) Inventors: Paul A. Dinnage, Stratham, NH (US); Stephen C. Brickley, Newbury, MA (US)

(73) Assignee: Munters Corporation, Amesbury, MA (US)

(*) Notice: Subject to any disclaimer, the term of this patent is extended or adjusted under 35 U.S.C. 154(b) by 144 days.

(21) Appl. No.: 10/832,363

(22) Filed: Apr. 27, 2004

(65) Prior Publication Data
US 2005/0235827 A1 Oct. 27, 2005

(51) Int. Cl.
*B01D 53/06* (2006.01)

(52) U.S. Cl. .................. 95/14; 95/21; 95/104; 95/106; 95/107; 95/113; 95/115; 95/120; 95/124; 95/141; 95/143; 96/109; 96/111; 96/113; 96/115; 96/130; 96/143; 96/150

(58) Field of Classification Search ............... 95/14, 95/21, 97, 104, 106, 107, 113–115, 120, 141, 95/123–125, 143, 148; 96/109, 111, 113–115, 96/123, 130, 125–128, 142–144, 150, 154
See application file for complete search history.

(56) References Cited

U.S. PATENT DOCUMENTS

| | | | | |
|---|---|---|---|---|
| 2,946,201 A | * | 7/1960 | Munters | 95/113 |
| 2,993,563 A | * | 7/1961 | Munters et al. | 95/104 |
| 3,009,540 A | * | 11/1961 | Munters | 95/113 |
| 3,009,684 A | * | 11/1961 | Munters | 165/17 |
| 3,176,446 A | * | 4/1965 | Siggelin | 96/118 |
| 4,012,206 A | * | 3/1977 | Macriss et al. | 95/113 |
| 4,324,564 A | | 4/1982 | Oliker | 55/20 |
| 4,701,189 A | | 10/1987 | Oliker | 55/34 |
| 4,729,774 A | | 3/1988 | Cohen | 55/181 |
| 4,846,855 A | * | 7/1989 | Tsujimoto | 95/113 |
| 4,926,618 A | | 5/1990 | Ratliff | 55/20 |
| 4,952,283 A | | 8/1990 | Besik | 165/4 |
| 5,116,396 A | | 5/1992 | Prasad et al. | 62/24 |
| 5,158,582 A | * | 10/1992 | Onitsuka et al. | 95/129 |
| 5,435,981 A | | 7/1995 | Ichiki et al. | 423/239.1 |

(Continued)

FOREIGN PATENT DOCUMENTS

DE         39 35 094 A1 *  4/1991

(Continued)

*Primary Examiner*—Robert A. Hopkins
(74) *Attorney, Agent, or Firm*—Fitzpatrick, Cella, Harper & Scinto

(57) ABSTRACT

A method of reducing the sorbate concentration of a process fluid stream using a sorption bed system includes the following steps. A mass of a sorbent material is rotated so that, in a cycle of operation, a given volume of the sorbent mass sequentially passes through first, second, third, fourth, fifth, and sixth zones, before returning to the first zone. A process fluid stream is passed through the sorbent mass in the first zone, and a regeneration fluid stream is passed through the sorbent mass in the fourth zone. A first isolation fluid stream is recycled in a closed loop, independent of the process fluid stream and the regeneration fluid stream, between the sorbent mass in the second zone and in the sixth zone. A second isolation fluid stream, meanwhile, is recycled in a closed loop, independent of the process fluid stream, the regeneration fluid stream, and the first isolation fluid stream, between the sorbent mass in the third zone and in the fifth zone.

28 Claims, 14 Drawing Sheets

U.S. PATENT DOCUMENTS

| | | | |
|---|---|---|---|
| 5,653,115 A * | 8/1997 | Brickley et al. | 62/94 |
| 5,659,974 A | 8/1997 | Graff | 34/378 |
| 5,660,048 A | 8/1997 | Belding et al. | 62/94 |
| 5,688,305 A * | 11/1997 | Graeff | 95/14 |
| 5,727,394 A | 3/1998 | Belding et al. | 62/94 |
| 5,860,284 A | 1/1999 | Goland et al. | 62/94 |
| 5,890,372 A | 4/1999 | Belding et al. | 62/271 |
| 5,891,219 A * | 4/1999 | Klobucar et al. | 95/113 |
| 5,915,816 A | 6/1999 | Graff | 34/378 |
| 5,980,615 A | 11/1999 | Roe | 96/111 |
| 6,003,327 A | 12/1999 | Belding et al. | 62/271 |
| 6,050,100 A | 4/2000 | Belding et al. | 62/271 |
| 6,294,000 B1 * | 9/2001 | Klobucar | 95/113 |
| 6,328,787 B1 * | 12/2001 | Yamauchi | 95/113 |
| 6,547,853 B1 | 4/2003 | Fukuhori et al. | 95/113 |
| 2002/0035923 A1 | 3/2002 | Fukuhori et al. | 95/113 |

FOREIGN PATENT DOCUMENTS

| | | |
|---|---|---|
| EP | 0249003 A1 * | 12/1987 |
| JP | 62-176519 A * | 8/1987 |
| JP | 2-241516 A * | 9/1990 |

* cited by examiner

| 290 | SFPM | 293 | Deg F |
|---|---|---|---|
| 3856 | Pa | 173 | gpp |

| 290 | SFPM | 145 | Deg F |
|---|---|---|---|
| 4251 | Pa | 207.5 | gpp |

| 631 | SFPM | 97.1 | Deg F |
|---|---|---|---|
| 51.9 | Pa | 2.21 | gpp |

| 631 | SFPM | 80 | Deg F |
|---|---|---|---|
| 173.5 | Pa | 7.5 | gpp |

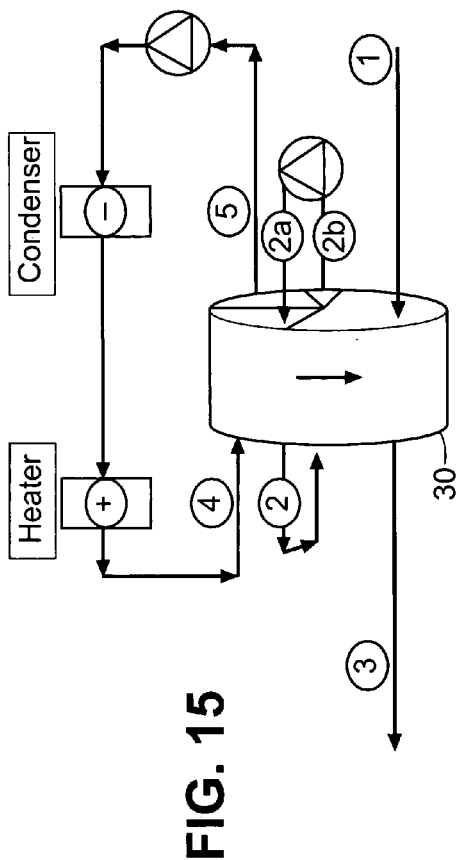

FIG. 15

| Ideal | 1 | 2 | 2a,b | 3 | 4 | 5 |
|---|---|---|---|---|---|---|
| SCFM | 1000 | 31 | 31 | 1000 | 131 | 131 |
| DB (F) | 75 | 254 | 75 | 88 | 275 | 165 |
| HR (gr/lb) | 10 | 78 | 8 | 1.45 | 150 | 224 |
| Dewpoint | 11 | 60 | 11.6 | -24.1 | 78.8 | 90.8 |

Real World Ideal leakage effects with rotor with 1.6ft2 area at boundary between two sectors

| | | Dewpoint Loss (deg F) | Reg out Dp | Condenser Performance Loss |
|---|---|---|---|---|
| Matrix 1 | Dewpoint | -24.1 | 0.1 | 90.7 | 0.3% |
| Matrix 2 | Dewpoint | -23.9 | 0.3 | 90.6 | 1.4% |
| Matrix 3 | Dewpoint | -23.4 | 0.7 | 90.4 | 3.7% |

Caused by Dilution leakage path at given rates

| | Average Delta P | Delta Gr | Delta P | SCFM per path | | | 1.6 | Diluted effect of leaked on target airstream GR/lb | | |
|---|---|---|---|---|---|---|---|---|---|---|
| | | | | matrix 1 | matrix 2 | matrix 3 | | matrix 1 | matrix 2 | matrix 3 |
| Purge (2) to Pout (3) | 76.55 | | 1.75 | 0.08 | 0.32 | 0.80 | | 1.46 | 1.47 | 1.51 |
| Purge (2a) to Rout (5) | -216 | | 1.75 | 0.17 | 0.67 | 1.67 | | 223.81 | 222.97 | 221.29 |

ROTARY BED SORPTION SYSTEM INCLUDING AT LEAST ONE RECYCLED ISOLATION LOOP, AND METHODS OF DESIGNING AND OPERATING SUCH A SYSTEM

BACKGROUND OF THE INVENTION

1. Field of the Invention

The present invention relates generally to a rotary bed sorption system, and, in particular, to a rotary bed sorption system that includes one or more recycled isolation loops. The invention also relates to methods of designing and operating such a system.

2. Description of the Related Art

Rotary bed sorption systems have long been used to collect a sorbate from one fluid stream, sometimes called a process or sorption fluid stream, and transfer it, in a more concentrated form, to a second fluid stream, sometimes called a desorption or regeneration fluid stream. Commonly-removed sorbates include water vapor, volatile organic compounds ("VOCs"), nitrous oxides ("NOx"), and the like.

It is important in a rotary bed sorption system, particularly one in which a low sorbate concentration is desired in the treated fluid, to minimize any cross-contamination between the process fluid stream and the regeneration fluid stream. Contamination can result from pressure differences in the fluid streams themselves, or vapor pressure differences within the matrix of the rotating sorbent disk.

Another source of possible contamination lies in areas of the sorbent disk that are adjacent to the active sorptive area, but that do not see active fluid flow during the cycle. Usually these are the areas at the center and outer periphery of the sorbent disk that are covered by sealing systems. Typically, sorbent disks are intentionally designed to have these "dead zones," which act as a thermal insulator, keeping the rotor housing cool and preventing its thermal expansion which could lead to premature mechanical failure of the component. It has been demonstrated that in systems designed to achieve a very low sorbate concentration in the treated fluid stream, these areas can act as "sinks" for the vapor being removed. The sinks accumulate vapor when they are adjacent to the regeneration zone, where they are exposed through diffusive forces to the high concentration of the vapors in the regeneration zone, but are not subject to the heat of the regeneration, due to the high insulating characteristics of the glass/ceramic structure. The sorbent then can come to near equilibrium with the high-concentration vapor, but at a much lower temperature. The sinks release their payload when they are adjacent to the very low-concentration fluid in the process section of the system. The vapor pressure difference overcomes the diffusive force of the structure, and trace amounts of vapor are released into the treated fluid stream, causing detrimental increases in the concentration of the vapor being removed.

It is known to incorporate purge zones in rotary bed sorption systems for purposes of cooling the sorbent matrix, recovering regeneration heat, or preconditioning the regeneration fluid stream prior to its passing through the sorbent matrix. An example of a sorption bed system including a recirculating purge loop is disclosed in U.S. Pat. No. 4,701,189. However, there are believed to be no teachings in the prior art of the use of one or more zones to reduce the diffusion of moisture through the sorbent matrix from a higher-concentration fluid stream, or to reduce the carryover of vapor from a higher-pressure fluid stream to a lower-pressure fluid stream.

SUMMARY OF THE INVENTION

The present invention uses one or more isolation loops to reduce cross-contamination between sorption and desorption zones of rotary sorption beds caused by pressure imbalances and large vapor pressure differences of the various fluid streams.

In one embodiment of the invention, a method of reducing the sorbate concentration of a process fluid stream using a sorption bed system comprising a rotating mass of a regenerable sorbent material includes steps of rotating the sorbent mass so that, in a cycle of operation, a given volume of the sorbent mass sequentially passes through first, second, third, fourth, fifth, and sixth zones, before returning to the first zone; passing a process fluid stream through the sorbent mass in the first zone; passing a regeneration fluid stream through the sorbent mass in the fourth zone; recycling a first isolation fluid stream in a closed loop, independent of the process fluid stream and the regeneration fluid stream, between the sorbent mass in the second zone and in the sixth zone; and recycling a second isolation fluid stream in a closed loop, independent of the process fluid stream, the regeneration fluid stream, and the first isolation fluid stream, between the sorbent mass in the third zone and in the fifth zone.

Preferably, the direction of fluid flow in each of the first, fifth, and sixth zones is the same, and the direction of fluid flow in each of the second, third, and fourth zones is opposite that of the fluid flow in the first, fifth, and sixth zones.

Optionally, additional recycled isolation loops can be added in a similar manner if a further reduction in the sorbate concentration of the process fluid stream is desired.

As used herein, "cycle of operation" means a path of movement of the sorbent mass during which the sorbent mass undergoes both a sorption and desorption process. The term "sequentially" refers to a relative order, but does not necessarily require that one immediately follow another. In this embodiment, for example, even if another zone were interposed between the first zone and the second zone, it would still be accurate to say that the sorbent mass sequentially passes through the first zone, the second zone, and so on.

In another embodiment of the invention, a rotary sorption bed system includes a process fluid stream; a regeneration fluid stream; a first isolation fluid stream that recirculates in a closed loop independent of the process fluid stream and the regeneration fluid stream; a second isolation fluid stream that recirculates in a closed loop independent of the process fluid stream, the regeneration fluid stream, and the first isolation fluid stream; and a rotating mass of a regenerable sorbent material through which each of the process fluid stream, the regeneration fluid stream, the first isolation fluid stream, and the second isolation fluid stream is passed. In a cycle of operation, a given volume of the sorbent mass sequentially passes through the process fluid stream, the first isolation fluid stream, the second isolation fluid stream, the regeneration fluid stream, the second isolation fluid stream, and the first isolation fluid stream, before returning to the process fluid stream. Preferably, the process fluid stream and the regeneration fluid stream are passed through the sorbent mass in opposite directions, and each of the first isolation fluid stream and the second isolation fluid stream is passed through the sorbent mass in the same direction as the fluid stream immediately following the respective first or second isolation fluid stream in the direction of rotation of the sorbent mass.

Optionally, the system of this embodiment may further include a third isolation fluid stream that recirculates in a closed loop independent of the process fluid stream, the regeneration fluid stream, the first isolation fluid stream, and the second isolation fluid stream. Preferably, the third isolation fluid stream is arranged such that the given volume of the sorbent mass sequentially passes through the process fluid stream, the first isolation fluid stream, the second isolation fluid stream, the third isolation fluid stream, the regeneration fluid stream, the third isolation fluid stream, the second isolation fluid stream, and the first isolation fluid stream, before returning to the process fluid stream. Preferably, the process fluid stream and the regeneration fluid stream are passed through the sorbent mass in opposite directions, and each of the first isolation fluid stream, the second isolation fluid stream, and the third isolation fluid stream is passed through the sorbent mass in the same direction as the fluid stream immediately following the respective first, second, or third isolation fluid stream in the direction of rotation of the sorbent mass.

In still another embodiment of the invention, a method of designing a sorption bed system, in which a mass of a regenerable sorbent material is rotated so that a given volume of the sorbent mass alternately passes through a process fluid stream and a regeneration fluid stream, includes steps of (a) determining whether at least one criterion selected from the following is satisfied: (I) the temperature of one fluid stream is less than or equal to the dew point of an adjacent fluid stream, (ii) there is a difference in vapor pressure of at least about 150 Pa between zones of the sorbent material through which adjacent fluid streams pass, (iii) the difference in absolute pressure between adjacent fluid streams exceeds a design pressure of a sealing structure of the sorption bed system, and (iv) permeation of one fluid stream through the sorbent material into the adjacent fluid stream affects the sorbate concentration of one or both of the adjacent fluid streams by at least 10%; (b) if it is determined in step (a) that the at least one criterion is satisfied, adding to the system an isolation fluid stream that recirculates in a closed loop independent of the other fluid streams; and (c) repeating steps (a) and (b) until it is determined in step (b) that the at least one criterion is not satisfied. Each isolation fluid stream added is arranged such that, in a cycle of operation, the given volume of the sorbent mass passes through the isolation fluid stream twice, once before the process fluid stream and after the regeneration fluid stream, and once after the process fluid stream and before the regeneration fluid stream. Again, as used herein, the terms "before" and "after" denote a relative order and do not require one to immediately precede or follow another unless so specified. Preferably, an isolation loop if added if any of a plurality of criterion selected from (I), (ii), (iii), and (iv) is satisfied. More preferably, an isolation loop is added if any of criterion (I), (ii), (iii), and (iv) is satisfied. The design of the sorption bed system may be done by modeling, as on a computer, for example, or by physical testing.

In a further embodiment of the invention, a rotary sorption bed system includes a rotating disk of a sorbent material that, in a cycle of operation, passes through a plurality of zones including a process zone, a regeneration zone, and at least one isolation zone. The regeneration zone and the at least one isolation zone each extend radially outward toward the periphery of the sorbent disk to a greater extent than the process zone. In this manner, it is less likely that areas of the sorbent disk that are loaded with sorbate in the process zone will be able to escape regeneration or other treatment in the regeneration and isolation zones.

Preferably, the at least one isolation zone extends radially outward toward the periphery of the sorbent disk to a greater extent than the regeneration zone. Even more preferably, the regeneration zone extends radially outward toward the periphery of the sorbent disk by at least one flute height more than the process zone, and the at least one isolation zone extends radially outward toward the periphery of the sorbent disk by at least one flute height more than the regeneration zone. As used herein, the term "flute height" refers to the widest dimension of the channels in the sorbent disk through which the fluid streams flow. For a disk having channels with a circular cross section, the flute height corresponds to the channel diameter.

This embodiment can also be used in a system that includes a plurality of isolation zones, in which case each isolation zone preferably extends radially outward toward the periphery of the sorbent disk to a greater extent than at least the process zone, and preferably also the regeneration zone.

In yet another embodiment of the invention, a method of improving the performance of a rotary bed sorption system includes steps of rotating a mass of a regenerable sorbent material so that, in a cycle of operation, a given volume of the sorbent mass sequentially passes through first, second, third, and fourth zones, before returning to the first zone; passing the process fluid stream through the first zone in a first direction; passing the regeneration fluid stream through the third zone in a second direction that is opposite the first direction; and reducing cross-contamination between the process fluid stream and the regeneration fluid stream by recycling at least one isolation fluid stream between the sorbent mass in the second zone, where the isolation fluid stream passes through the sorbent mass in the second direction, and in the fourth zone, where the isolation fluid stream passes through the sorbent mass in the first direction.

A better understanding of these and other aspects of the present invention may be had by reference to the drawings and to the accompanying description, in which preferred embodiments of the invention are illustrated and described.

BRIEF DESCRIPTION OF THE DRAWINGS

FIG. 15 is a schematic flow diagram of a four-zone rotary sorption bed system.

DESCRIPTION OF THE PREFERRED EMBODIMENTS

Figure 1:
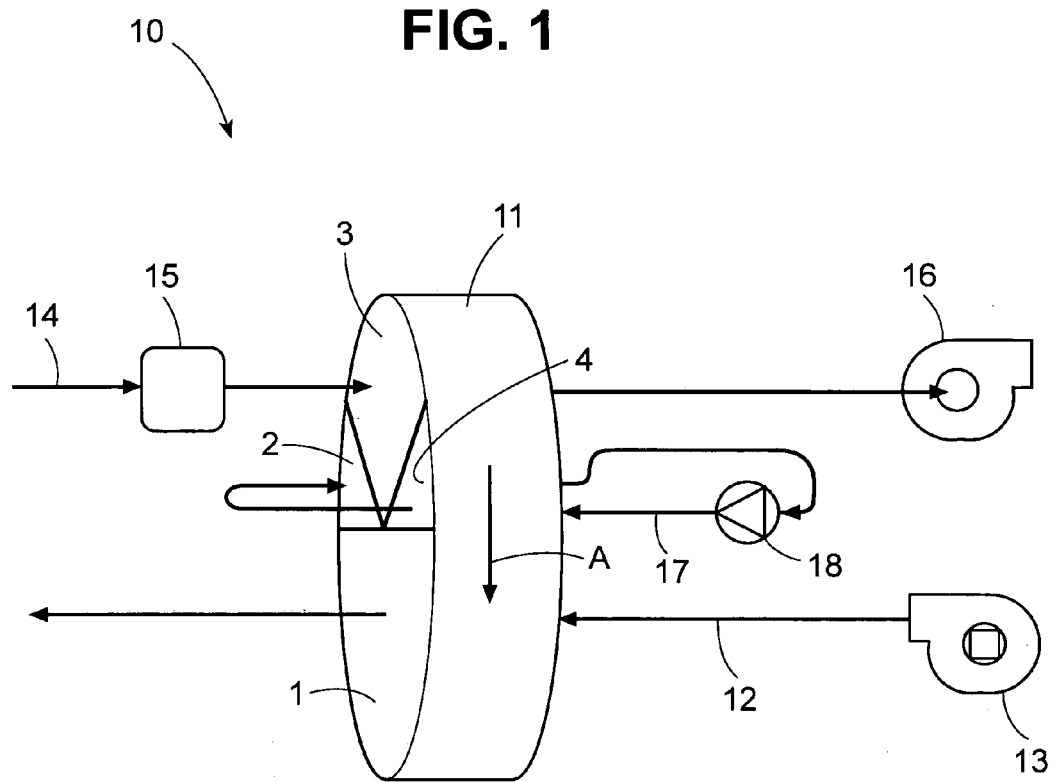
FIG. 1 is a schematic flow diagram illustrating a preferred embodiment of a rotary bed sorption system in accordance with the invention.

FIG. 1 illustrates a first preferred embodiment of a rotary sorption bed system 10 in accordance with the present invention. The system includes a rotating disk-shaped porous mass 11 of a conventional construction containing or coated with regenerable sorbent material that, in a cycle of operation, sequentially passes through a first zone 1, a second zone 2, and third zone 3, and a fourth zone 4. The sorbent mass 11 is rotated about its axis in the direction indicated by arrow A by a known rotor mechanism (not shown).

A process fluid stream 12 carrying a sorbate (e.g., water vapor) is passed through the sorbent mass 11 in the first zone 1, where the sorbate is sorbed (i.e., loaded) onto the sorbent mass 11. The process fluid stream exiting the sorbent mass has a reduced sorbate concentration compared to the process fluid stream entering the sorbent mass. Optionally, a fan, blower, or other fluid-moving device 13 can be used to drive the process fluid flow through duct work (not shown).

A regeneration fluid stream 14 is passed through the sorbent mass 11 in the third zone 3, in a direction opposite to the flow of the process fluid stream 12. The sorbate from the process fluid stream that was collected in the sorbent mass 11 is released into the regeneration fluid stream. A heater 15 can be provided to heat the regeneration fluid stream 14 prior to its passing through the sorbent mass 11. As with the process fluid stream, a fan, blower, or other fluid-moving device 16 can be used to drive the regeneration fluid flow.

Figure 14:
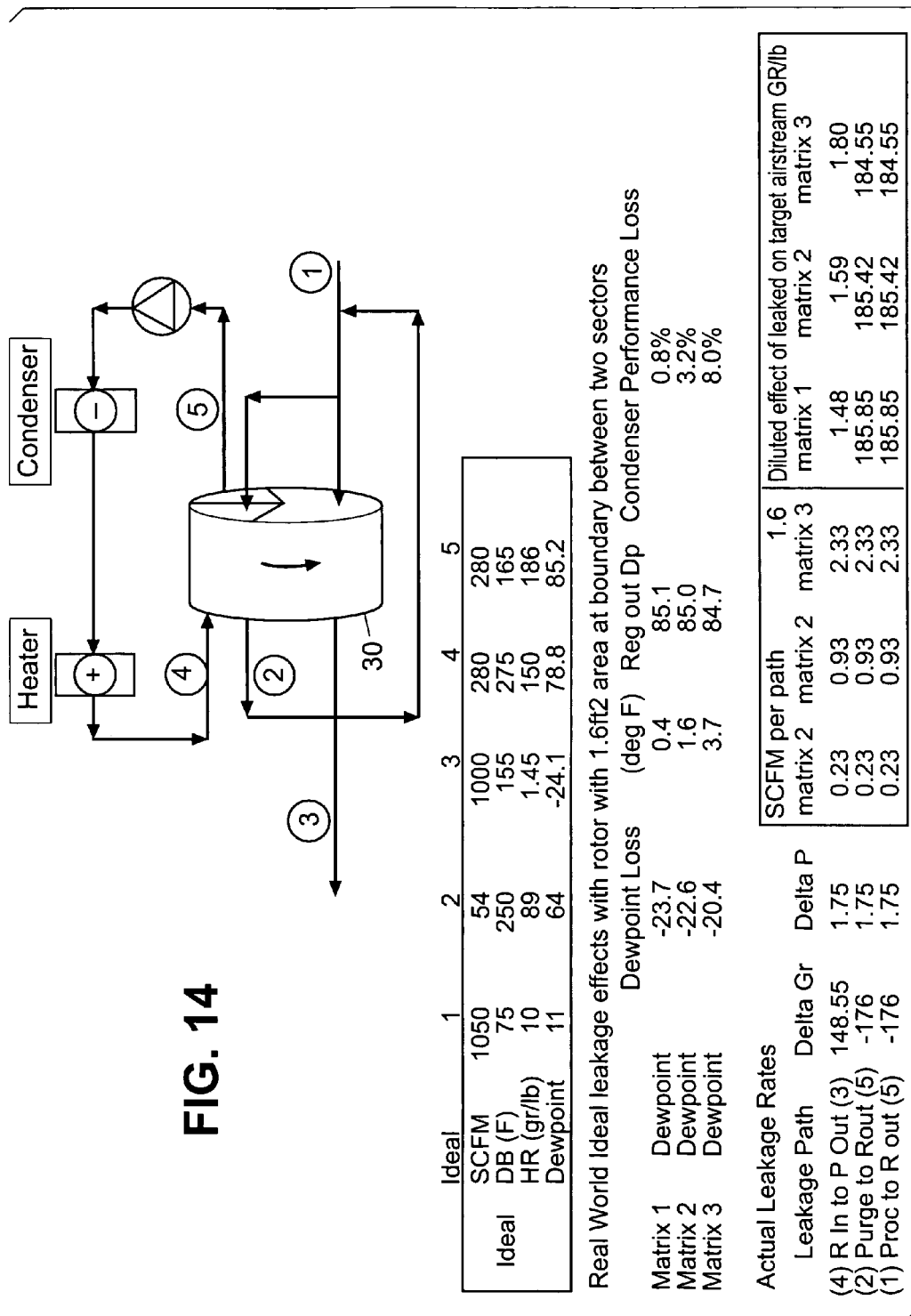
FIG. 14 is a schematic flow diagram of a three-zone rotary bed sorption system.

Although neither the process fluid stream 12 nor the regeneration fluid stream 14 is shown in FIG. 1 as being a closed loop circuit, those skilled in the art will appreciate that one or both of those fluid streams can be recirculated in a closed loop. FIG. 14, for example, depicts an arrangement wherein, upon exiting the sorbent mass, the regeneration fluid stream is cooled to condense vapor out of the fluid stream and then is reheated before being routed back through the sorbent mass.

An isolation fluid stream 17 is recycled in a closed loop, independent of the process fluid stream 12 and the regeneration fluid stream 14, between the sorbent mass 11 in the second zone 2 and in the fourth zone 4. Preferably, the direction that the isolation fluid stream 17 flows through the sorbent mass 11 is the same direction as the fluid flowing through the zone immediately following the isolation zone in the direction of rotation of the sorbent mass 11. In FIG. 1, for example, the isolation fluid stream 17 passes through the second zone 2 in the same direction that regeneration fluid stream 14 flows through the third zone 3, and passes through the fourth zone 4 in the same direction that the process fluid stream 12 flows through the first zone 1. Alternatively, the direction that the isolation fluid stream flows through the sorbent mass could be opposite from the direction of fluid flow through the zone immediately following the isolation zone in the direction of rotation of the sorbent mass. A fan, blower, or other fluid-moving device 18 can optionally be provided to drive the isolation fluid flow. As will be discussed in greater detail below in connection with specific examples, providing the recycled isolation loop helps to reduce cross-contamination between the process fluid stream 12 and the regeneration fluid stream 14.

Figure 2:
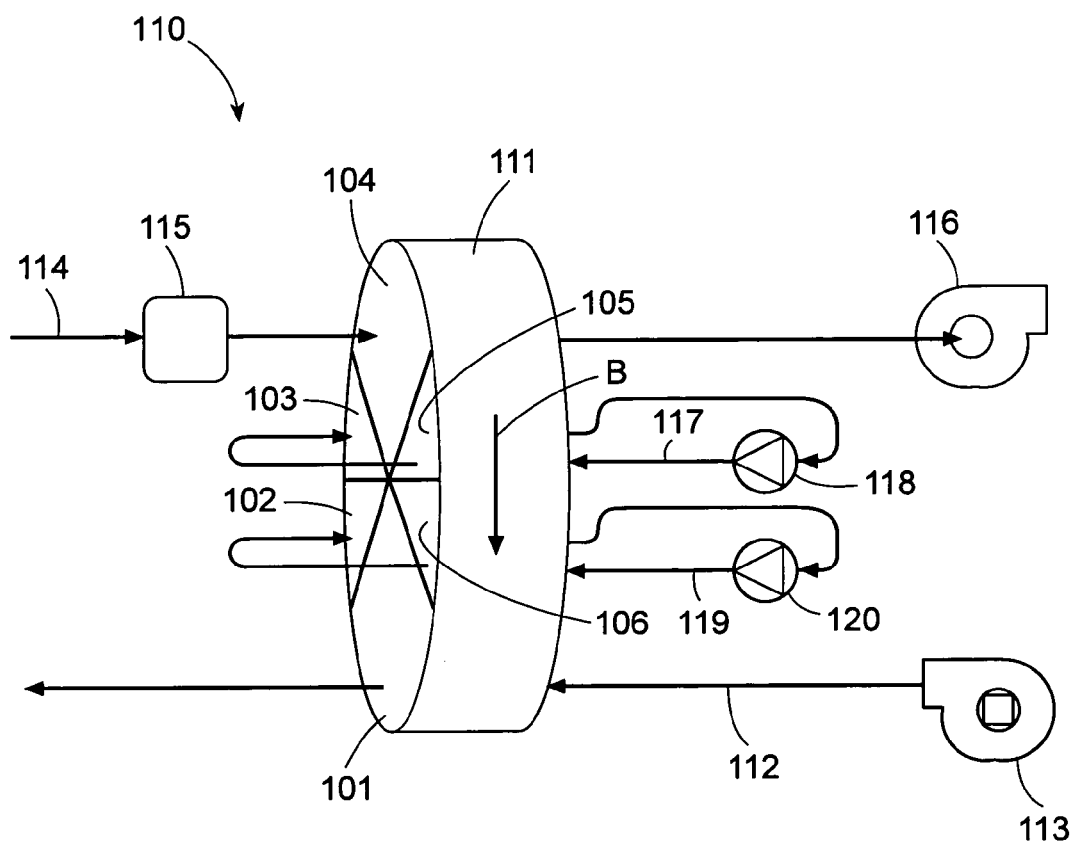
FIG. 2 is a schematic flow diagram illustrating another preferred embodiment of a rotary bed sorption system in accordance with the invention.

In certain applications, further benefits can be achieved by providing additional recycled isolation loops. FIG. 2 illustrates another preferred embodiment of a rotary bed sorption system 110 in which two isolation fluid streams 117, 119 are independently recycled through a rotating sorbent mass 111. The sorbent mass 111, in a cycle of operation, sequentially passes through a first zone 101, a second zone 102, a third zone 103, a fourth zone 104, a fifth zone 105, and a sixth zone 106. As with the first embodiment, the sorbent mass 111 is rotated about its axis in the direction indicated by arrow B by a known rotor mechanism (not shown).

A process fluid stream 112 is passed through the sorbent mass 111 in the first zone 101. A fan, blower, or other fluid-moving device 113 can optionally be used to drive the process fluid flow.

A regeneration fluid stream 114 is passed through the sorbent mass 111 in the fourth zone 104, in a direction opposite to the flow of the process fluid stream 112. A heater 115 can be provided to heat the regeneration fluid stream 114 prior to its passing through the sorbent mass 111. As with the process fluid stream, a fan, blower, or other fluid-moving device 116 can be used to drive the regeneration fluid flow, as necessary.

A first isolation fluid stream 117 is recycled in a closed loop, independent of the process fluid stream 112, the regeneration fluid stream 114, and a second isolation fluid stream 119, between the sorbent mass 111 in the third zone 103 and in the fifth zone 105. Preferably, the direction that the first isolation fluid stream 117 flows through the sorbent mass 111 is the same direction as the fluid flowing through the zone immediately following the isolation zone in the direction of rotation of the sorbent mass 111. In FIG. 2, for example, the first isolation fluid stream 117 passes through the third zone 103 in the same direction as the flow of the regeneration fluid stream 114 through the fourth zone 104, and passes through the fifth zone 105 in the same direction as the flow of the second isolation fluid stream 119 through the sixth zone 106. Alternatively, the direction of isolation fluid flow through the third and fifth zones could be reversed from that shown in FIG. 2. A fan, blower, or other fluid-moving device 118 can be used to drive the first isolation fluid flow.

Meanwhile, the second isolation fluid stream 119 is recycled in a closed loop, independent of the process fluid stream 112, the regeneration fluid stream 114, and the first isolation fluid stream 117, between the sorbent mass 111 in the second zone 102 and in the sixth zone 106. As with the first isolation fluid stream, the direction that the second isolation fluid stream 119 is passed through the sorbent mass 111 preferably is the same as the fluid flowing through the zone immediately following the isolation zone in the direction of rotation of the sorbent mass 111. In FIG. 2, for example, the second isolation fluid stream 119 passes through the second zone 102 in the same direction that the first isolation fluid stream 117 flows through the third zone 103, and passes through the sixth zone 106 in the same direction that the process fluid stream 112 flows through the first zone 101. Alternatively, the direction of isolation fluid flow through the second and sixth zones could be reversed from that shown in FIG. 2. A fan, blower, or other fluid-moving device 120 can be used to drive the second isolation fluid flow.

In the preferred embodiments described above, those of ordinary skill in the art will recognize that the selection of specific flow rates, pressures, temperatures, relative humidities, etc., depends on the particular application for the sorption system, and will be able to make appropriate selections for a given application.

The present invention is not limited to two isolation loops, but can use three or more isolation loops depending on the characteristics of the various fluid streams and the desired level of treatment. Preferably, each additional isolation loop is arranged so that the isolation fluid stream passes through the sorbent mass in the same direction as the process or regeneration fluid stream that follows the isolation fluid stream in the direction of rotation of the sorbent mass. It is also preferred that each additional isolation loop be arranged so that, in a cycle of rotation, the sorbent mass sequentially passes through the isolation fluid streams in ascending and then descending order. In other words, for an eight-zone system with three isolation loops, for example, the sorbent mass would sequentially pass through a regeneration fluid stream, a first isolation fluid stream, a second isolation fluid stream, a third isolation fluid stream, a process fluid stream, the third isolation fluid stream, the second isolation fluid stream, the first isolation fluid stream, and so on.

As described below, the number of isolation loops can be selected based on a determination of whether certain selected criteria relating to temperature, vapor pressure, absolute pressure, and/or leakage are satisfied. Whether the criteria are satisfied can be determined either by simulation or by physical testing. In the event it is determined that one or more of the selected criteria is satisfied, then this indicates that there may be a potential benefit in adding an isolation loop to the system. After the isolation loop is added, the determination is made again, and so on, until the selected criteria are not satisfied.

Absolute Pressure Design Criterion

Figure 18:
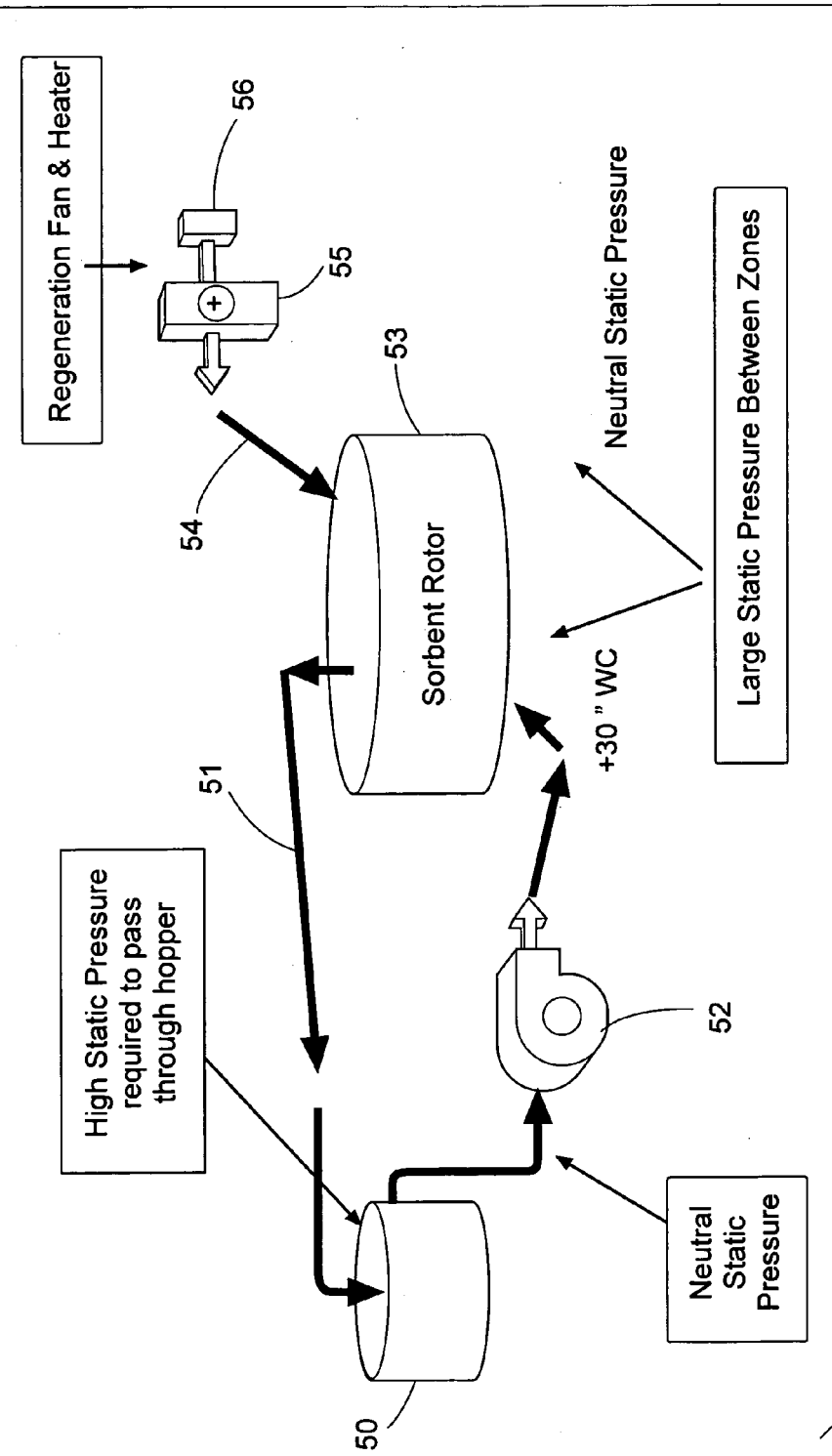
FIG. 18 is a schematic flow diagram of a hopper drier sorption unit.

In its simplest embodiment, e.g., a hopper drier sorption unit operating in a closed loop, the designer has the choice on where to locate the closed loop process fan. In the example shown in FIG. 18, there is shown a hopper 50, a process air stream 51, a process air fan 52, a rotating sorbent disk 53, a regeneration air stream 54, a regeneration air heater 55, and a regeneration air fan 56. The hopper 50 has a very large air-side pressure drop that can exceed 30" WC (inches of water column). The hopper 50 is the most "open" position in the closed loop and thus will equilibrate to atmospheric pressure. The other portions of the loop will take on a pressure in accordance with their respective positions in the loop and the air driver in the loop.

In this application, a dew point of −40° F. and below is required. Typically all points within the controlled loop have dew points of below 14° F. This puts strict requirements on limiting air infiltration into (and out of) the controlled environment loop. An isolation or cooling air stream (not shown in FIG. 18) is required to achieve these dew points.

In a sorbent bed version of this device, dual towers filled with desiccant are utilized as the drying medium. Because these towers are constructed of metal, pressure for the magnitude described is not a design issue. However, due to the porosity of the desiccant disk, excessively high pressures (which would be typical if the desiccant disk were positioned after the air moving device) can cause damage to the disk, as well as create a second air path to the ambient, which significantly increases the amount of fresh air brought into the loop, and thus the drying load.

In this application a single closed loop is installed to provide for an isolation zone between the high-pressure closed loop and the regeneration air zone, which is typically at near ambient pressure. This closed loop then equilibrates in pressure to the midpoint between the high-pressure process zone, and the ambient-pressure regeneration zone. The net effect is that leakage out of the process loop is cut at least in half, and the performance benefits of the isolation stream are maintained.

Depending on the pressure required to move the air through the closed hopper loop, more than one isolation zone may be required. In some cases, pressures can exceed 50" WC, in which case two isolation zones may be required. The decision on how many zones are necessary is a function of the porosity of the disk, the maximum allowable contamination rate at the main leakage zone for the loop, and the relative pressure differences between the process and regeneration airstreams. Preferably, isolation loops are added to the system until the difference in absolute pressure between adjacent fluid streams does not exceed the design pressure of the sorbent disk sealing system, which is typically on the order of 7–10" WC.

Conversely, if the sorbent disk is placed prior to the fan, it will be operating at a negative pressure to ambient, and any infiltration of air through the sorbent disk will have a significant effect on the low dew point of air required in the application. In this case the closed loop isolation zone minimizes the leakage from the moist regeneration zone into the dry process loop. Once again, the number of loops is determined by the allowable infiltration into the process loop, which is a function of pressure, humidity, and disk porosity.

Condensation or Frost Design Criteria

In this determination the question is asked whether there is condensation or frost potential at the junction of any two adjacent zones. The effects of frost formation at a boundary can be devastating. Seals can be frozen to disk faces, and ice buildup can damage disk faces. The effects of condensation are less catastrophic; however, long-term water impingement to many desiccant types, especially silica gel, can have significant aging effects, eventually resulting in softening or loss in performance. This determination can be used in conjunction with insulation, or in lieu of insulation to prevent condensation or frost buildup.

Figure 3:
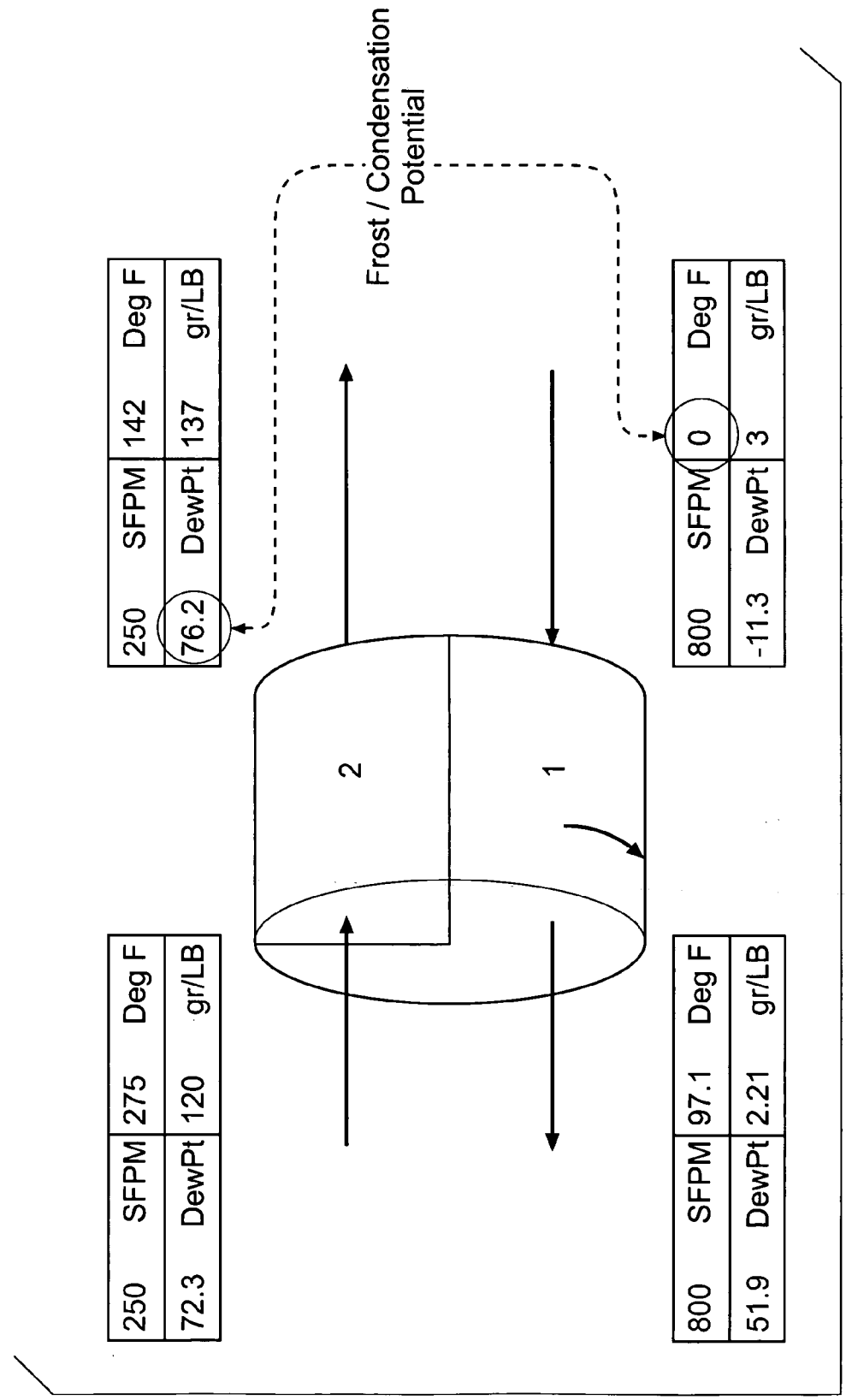
FIG. 3 is a schematic illustration of a conventional two-zone rotary bed sorption system.

In the below given freezer application where cold air needs to be further dehumidified, only humid ambient air is available for regeneration. In FIG. 3, the process fluid stream passes through zone 1 at a rate of 800 SFPM (standard feet per minute) and the regeneration fluid stream passes through zone 2 at a rate of 250 SFPM. As is evident in FIG. 3, from the temperatures in zone 1 and humidity conditions in zone 2, the boundaries between zones 1 and 2 clearly are candidates for condensation and ice buildup. Specifically, the regeneration outlet air has a dew point of 76.2° F. (137 grains per pound) and is located next to the process inlet air which has a temperature of 0° F. Localized cooling from leakage or conduction could easily create frost under these conditions.

Figure 4:
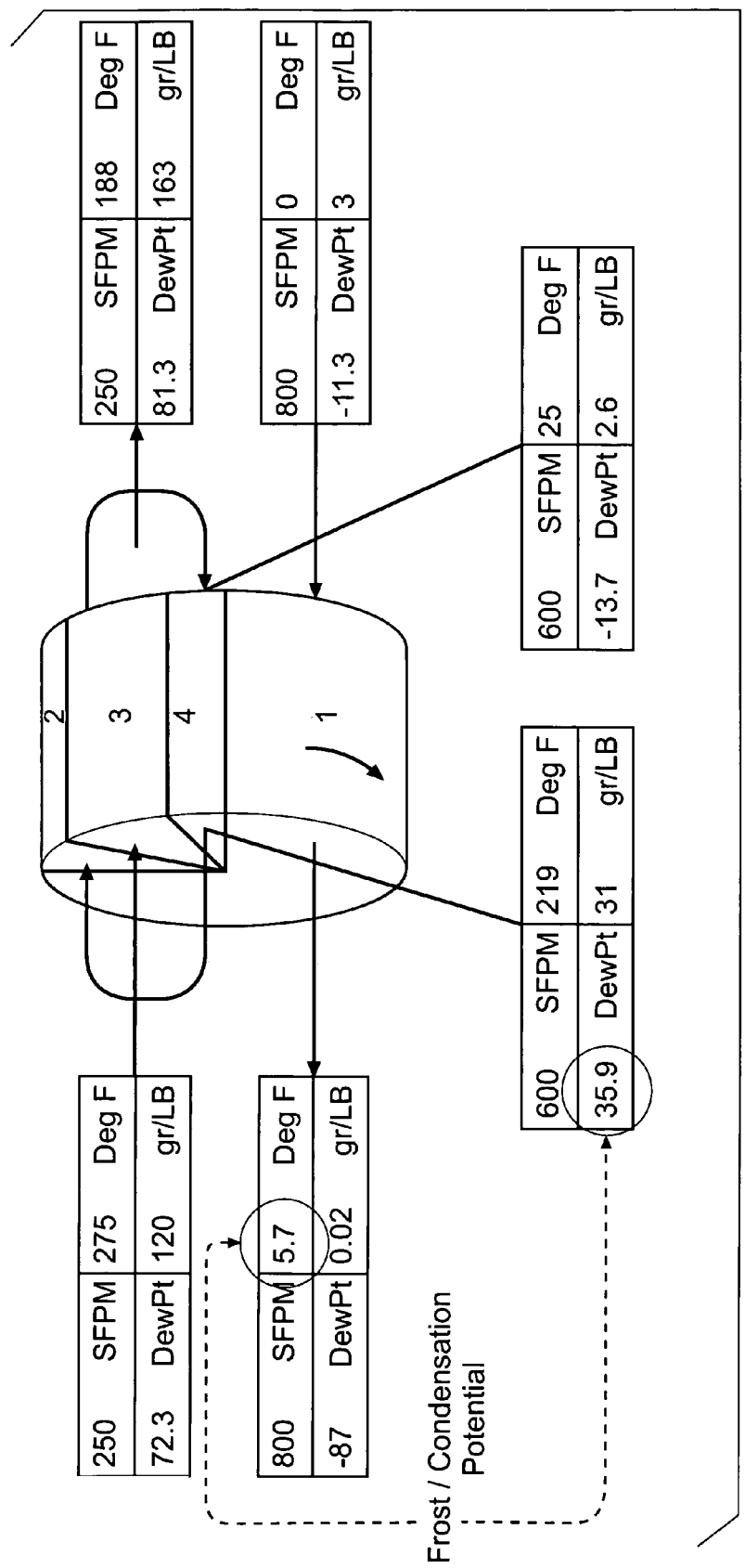
FIG. 4 is a schematic illustration of a four-zone rotary bed sorption system.

FIG. 4 illustrates a four-zone system in which an isolation loop has been added to the system shown in FIG. 3. In FIG. 4, zone 1 again represents the process fluid stream, zone 3 represents the regeneration fluid stream, and zones 2 and 4 represent isolation fluid streams of the isolation loop. Here, too, the temperature and humidity conditions of zones 1 and 4 are such that frost potential still exists along the boundary of zones 1 and 4, as indicated by the dashed arrow in FIG. 4.

Figure 5:
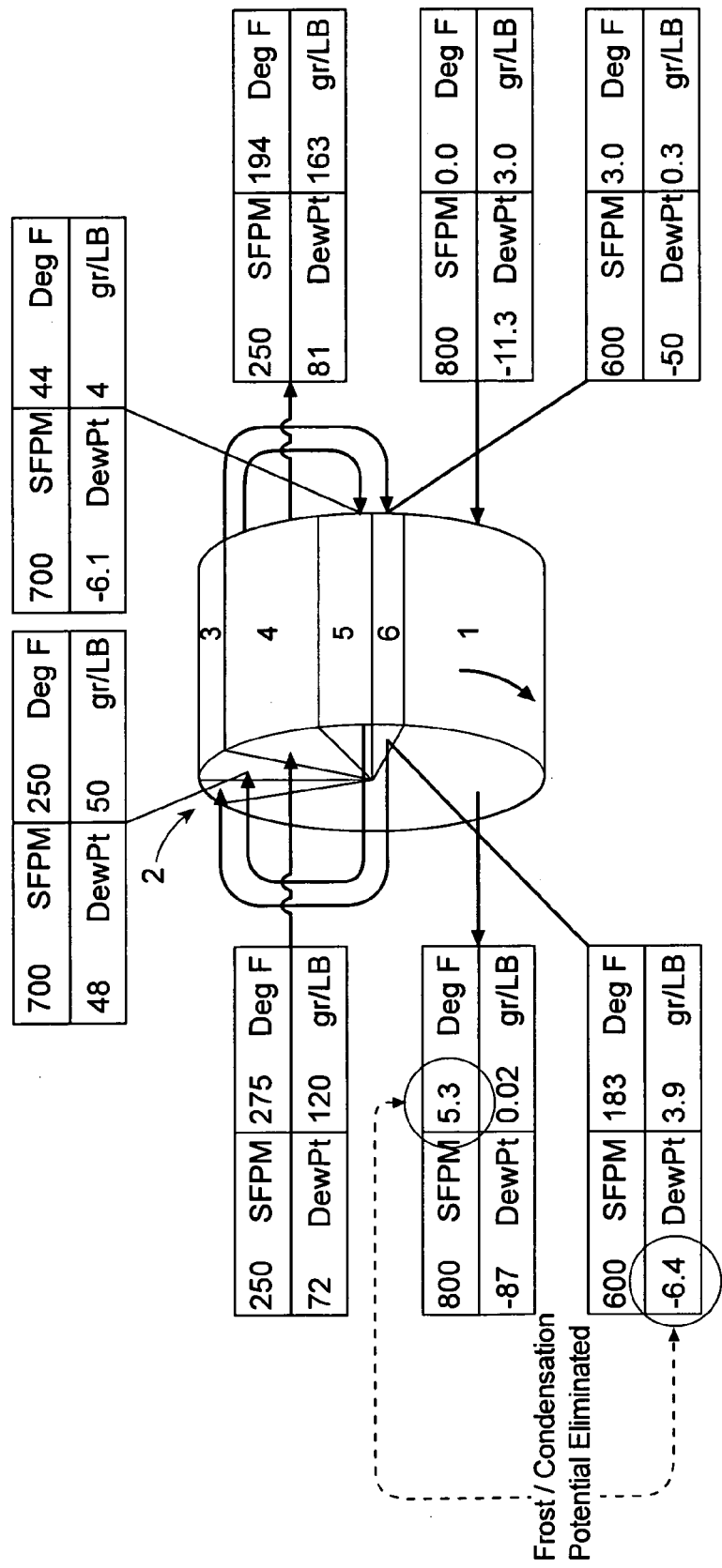
FIG. 5 is a schematic illustration of a six-zone rotary bed sorption system.

Therefore, an additional isolation loop is added to the system as shown in FIG. 5. In FIG. 5, zone 1 represents the process fluid stream, zone 4 represents the regeneration fluid stream, zones 2 and 5 represent isolation fluid streams of one isolation loop, and zones 3 and 6 represent isolation fluid streams of the other isolation loop. Now, because the dew point of the isolation fluid stream exiting from zone 6 is less than the temperature of the process fluid stream exiting from zone 1, the possibility of frost or condensation has been eliminated.

Vapor Pressure Design Criterion

At the boundary between two air flow zones the vapor pressure of the rotor material changes dramatically. The vapor pressure difference at this boundary is typically much larger than the static, or absolute, pressure differences of the two air circuits. As a result, vapor flow occurs across the permeable walls of the corrugated channels in the disk. This can occur without any air leakage as shown in U.S. Pat. No. 5,653,115. Adding one or more isolation loops in order to separate the driest and wettest air streams from each other can mitigate the effect of this moisture migration. Preferably, isolation loops are added until the difference in vapor pressure is less than about 150 Pa between zones of the sorbent material through which adjacent fluid streams pass.

Figure 6:
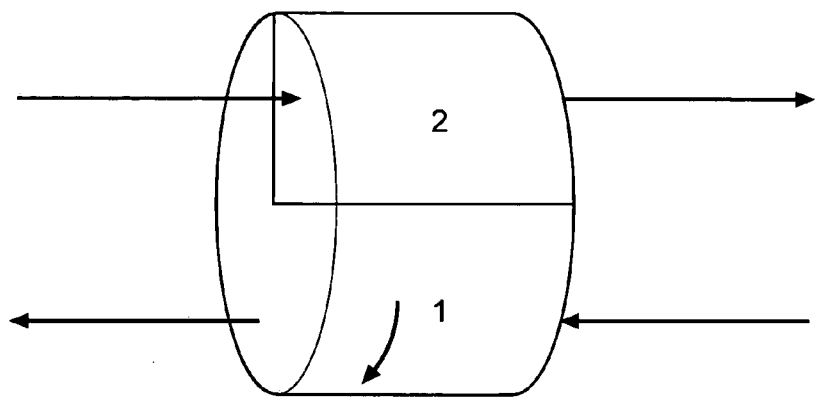
FIG. 6 is a schematic illustration of a conventional two-zone rotary bed sorption system.
Figure 7:
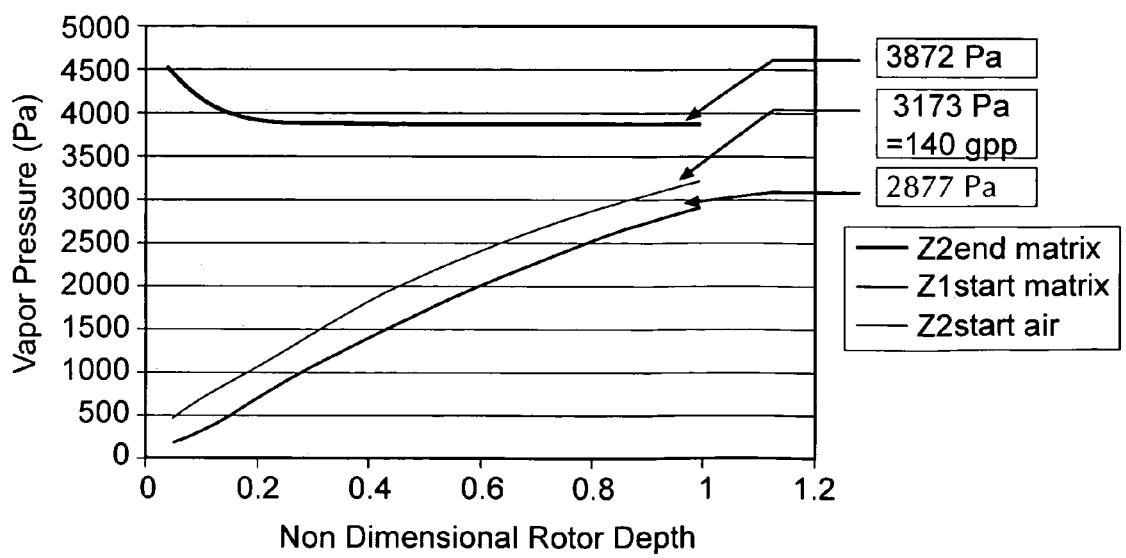
FIG. 7 is a graph plotting vapor pressures along the boundary of adjacent zones in the system shown in FIG. 6.

As an example, consider a rotor with a conventional two-zone configuration, with a 3:1 face area split between the process and regeneration air streams, as shown in FIG. 6. In FIG. 6, the process zone is represented by numeral 1 and the regeneration zone is represented by numeral 2. The vapor pressure differences along the boundary that separates the end of regeneration (zone 2) from the beginning of process (zone 1) are shown in FIG. 7. The vapor pressure differences across the walls of the matrix are very large and are a function of position in the direction of air flow. Even at the process exit side of the rotor the steady state differences in matrix vapor pressure are 995 Pa (3872 Pa–2877 Pa). In this case the air just leaving the rotor equilibrates to a vapor pressure of 3173 Pa, or 140 grains of water per pound of dry air (gpp or gr/LB). Although this is a small part of the total process air flow, it is a significant part of the overall average outlet condition of 2.21 gpp shown in FIG. 6.

Figure 8:
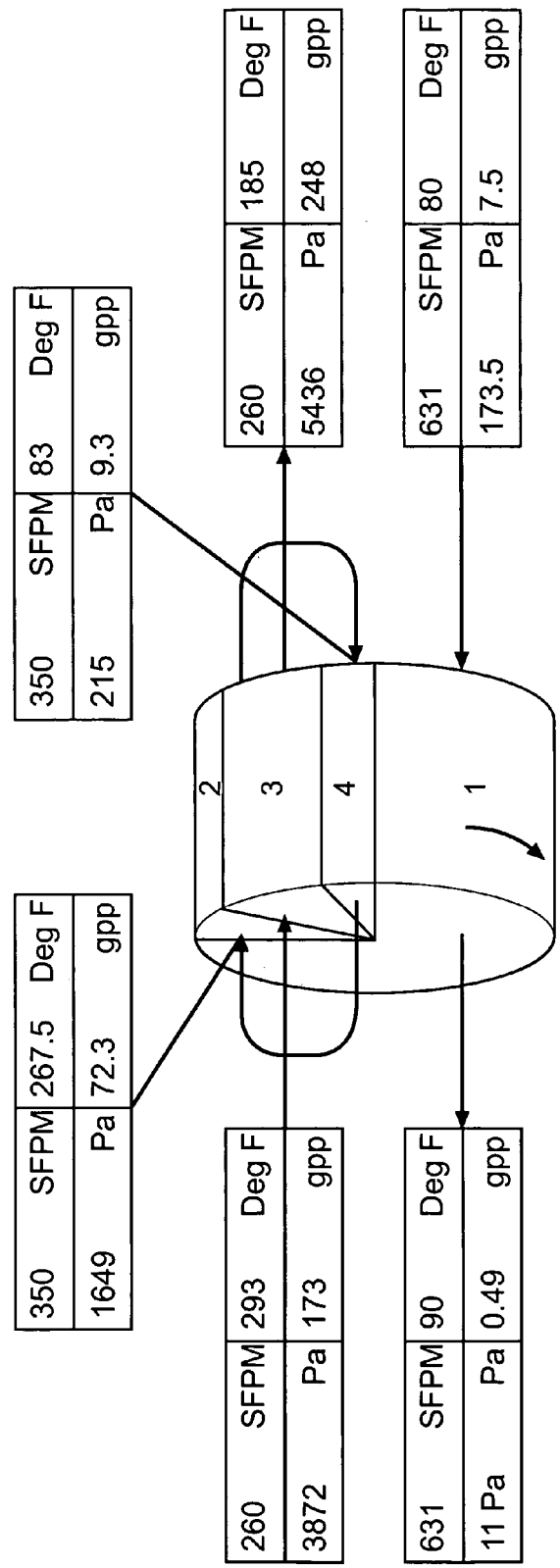
FIG. 8 is a schematic illustration of a four-zone rotary bed sorption system.

If an isolation loop is added to separate the two air streams while keeping the adsorption zone areas and flow rates the same, the results shown in FIG. 8 are obtained. In FIG. 8, the process zone is represented by numeral 1, the regeneration zone is represented by numeral 3, and the two isolation zones corresponding to the isolation loop are represented by numerals 2 and 4. As shown in FIG. 8, the net result of adding the isolation loop is a reduction in the humidity of the treated process air from 2.11 gpp (–16.8 F DP) to 0.49 gpp (–42 F DP).

Figure 9:
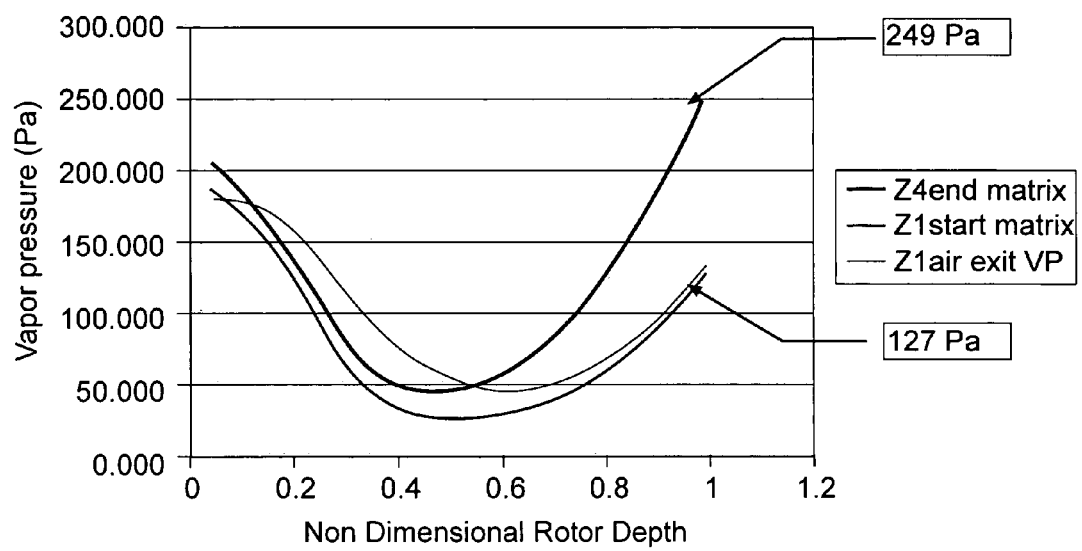
FIG. 9 is a graph plotting vapor pressures along the boundary of adjacent zones in the system shown in FIG. 8.

This can be explained by examining the matrix vapor pressure differential at the boundary between zones 4 and 1, as shown in FIG. 9. The addition of the isolation loop has lowered the matrix vapor pressure differences at the boundary by at least one order of magnitude lower than the two-zone case of FIGS. 6 and 7. The humidity ratio of the air is correspondingly lower at all depth positions of the boundary at the beginning of zone 1, contributing to the reduction in the overall leaving humidity ratio of the air from zone 1 from 2.21 gpp to 0.49 gpp (or –16.8 F DP vs –42 F DP). The addition of the isolation loop has reduced the vapor pressure delta to 122 Pa, which is within the preferred 150 Pa limit noted above.

Although the above discussion examines the vapor pressure differences at the boundary of zones 4 and 1, similar beneficial results occur at the boundary of zones 1 and 2.

Figure 10:
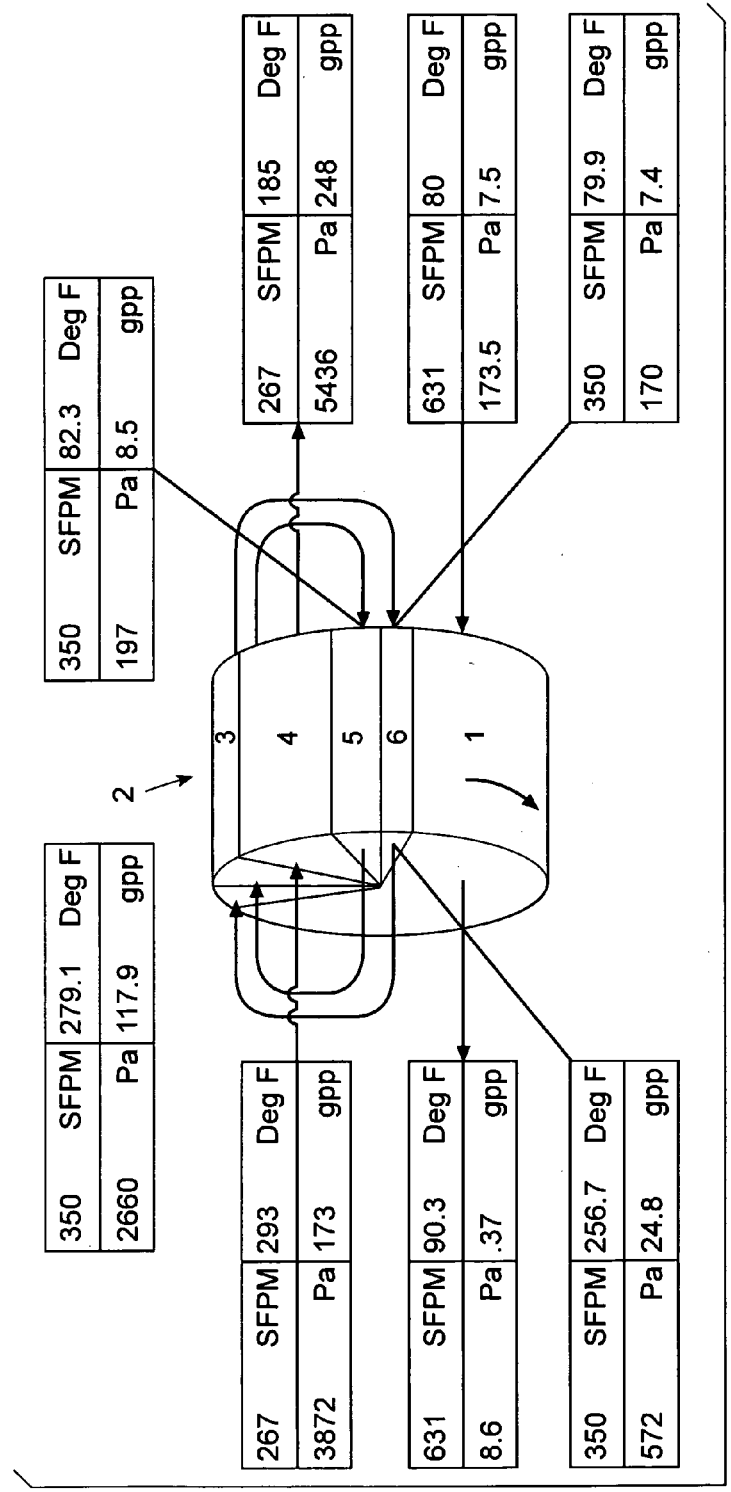
FIG. 10 is a schematic illustration of a six-zone rotary bed sorption system.

Performance may be further improved by adding additional isolation loops so that smaller vapor pressure differentials occur at each zone boundary. For example if the single loop previously described is divided into two independent loops, each half the size of the original loop, the performance obtained is shown in FIG. 10. In FIG. 10, the process zone is represented by numeral 1, the regeneration zone is represented by numeral 4, two isolation streams corresponding to a first isolation loop are represented by numerals 3 and 5, and two isolation streams corresponding to a second isolation loop are represented by numerals 2 and 6.

It can be seen from FIG. 10 that the additional isolation loop has reduced the treated air condition from 0.46 gpp to 0.37 gpp (or –42 F DP to –46.3 F DP), due largely to the more gradual transitions in vapor pressures across the boundary between zone 1 and surrounding zones 2 and 6.

Figure 11:
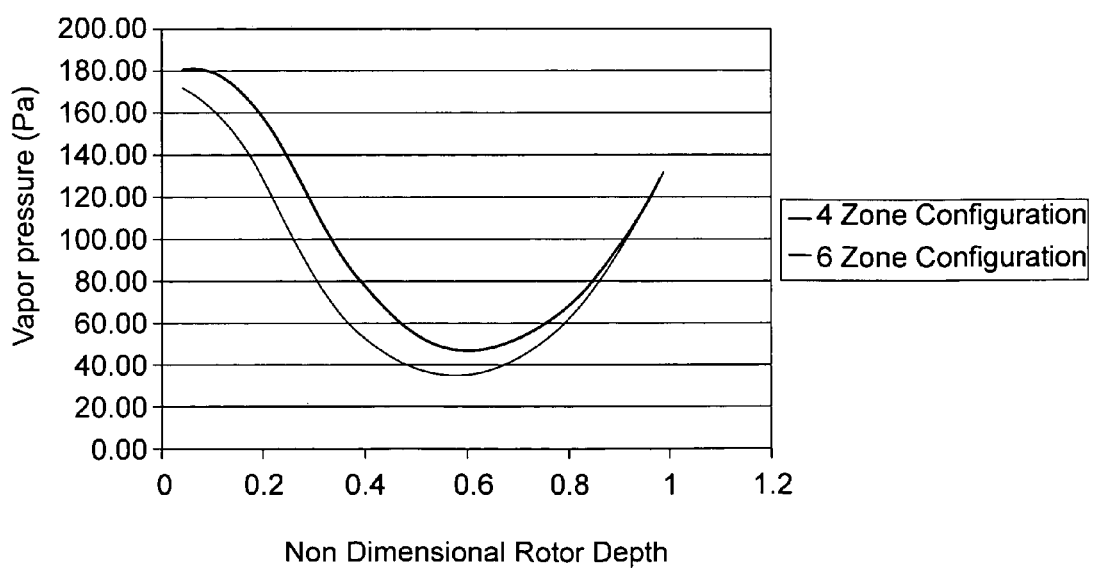
FIG. 11 is a graph comparing vapor pressures in the systems shown in FIGS. 8 and 10.

FIG. 11 shows the difference in air vapor pressures at the beginning of zone 1 for the four-zone system of FIG. 8 vs. the six-zone system of FIG. 10. The additional isolation loop in the six-zone system only provides about a 20% lower vapor pressure at the supply air boundary compared to the four-zone system, but is an important factor in lowering the concentration of moisture in the supply air by at least 20%.

It is not necessary for the isolation loops to be the same size or be exactly symmetrical. The flow velocity of each loop is optimum when the temperature and moisture conditions leaving the second pass of the loop (i.e., the isolation fluid stream adjacent to the process fluid stream) are nearly equal to the air conditions entering zone 1.

Leakage Design Criterion

Adding a single closed isolation loop to the system will reduce leakage of air by approximately one half. This is due to the closed loop nature of the isolation loop, which will cause it to equilibrate to an absolute pressure midway between the process and regeneration zones.

In certain applications the leakage between circuits must be minimized to the greatest extent possible. In concentration cycles, whether it be for VOC concentration or water concentration via closed-loop regeneration in low dew point environments (reference OPG Reactor), exfiltration from the process stream is as detrimental as infiltration, as the concentration ratio of vapor to the regeneration air stream must be maximized for cycle efficiency. In the case of the VOC concentrator, extra special care is taken to ensure even pressure balances between the process and regeneration circuits to maximize concentration ratios.

Figure 12:
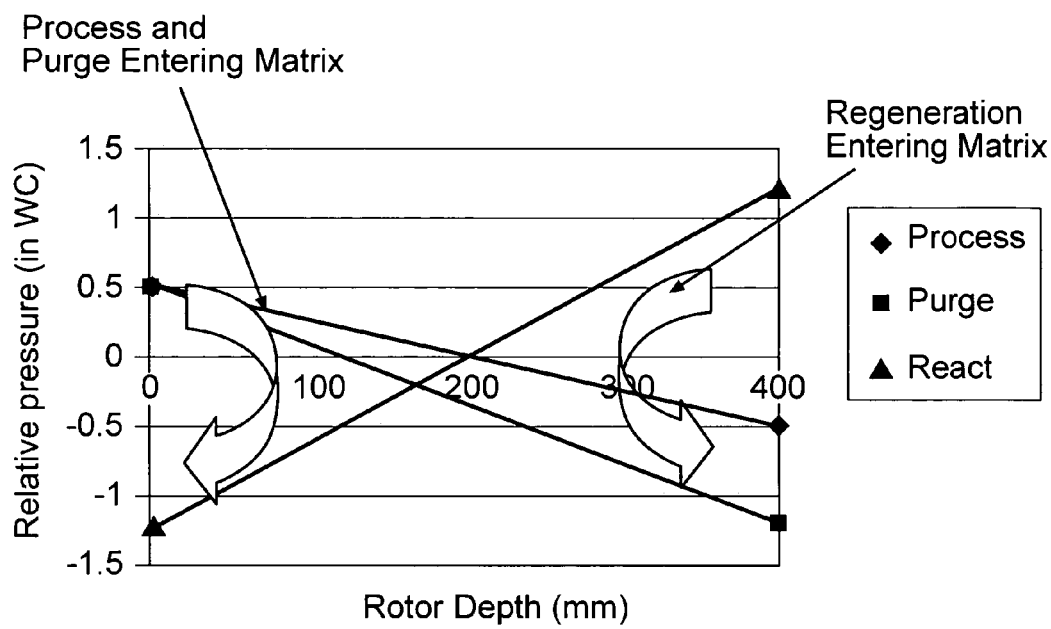
FIG. 12 is a graph plotting pressure drop as a function of rotor depth.

However, due to the counterflow nature of the rotor cycle, there will be cross-contamination between the two streams as the pressure drops flow in different directions through the rotor for each air stream, as shown in FIG. 12. This results in process inlet air flowing to the regeneration outlet, and regeneration inlet air flowing to the process outlet. This flow is due to the permeability of the thin flute walls in the disk.

Figure 13:
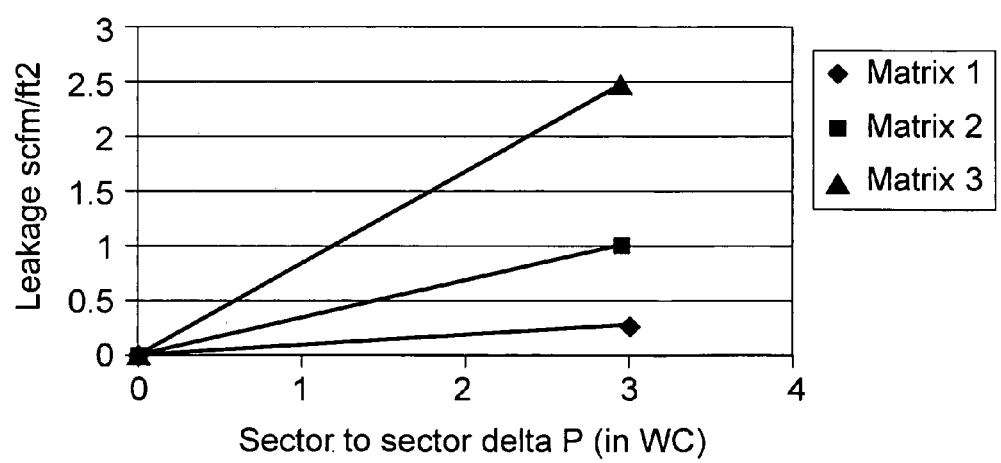
FIG. 13 is a graph of typical matrix leakage values.

For example, FIG. 12 represents the absolute pressure of the various air streams—process, regeneration, and purge—through a rotary sorbent disk that is well balanced with regard to the pressure between process and regeneration. As can be noted, due to the fact that air flows through the disk are countercurrent, there is always a differential pressure between the two streams, except for at most one point. FIG. 13 denotes the leakage or permeability of a disk in terms of standard cubic feet per minute per square foot (scfm/ft$^2$) in the direction perpendicular to flow.

Three generic matrix leakage rates are outlined which are typical for different types of sorptive medias. Typically molecular-sieve-based matrices have leakage rates most similar to matrix 3 values. It is noteworthy to mention that MS materials are also used where the lowest outlet concentrations are desired, both in water vapor removal as well as in VOC removal, making the internal leakage effect a significant real world constraint on system performance.

In a conventional three-zone system shown in FIG. 14, process air entering the sorbent matrix 30 is represented by numeral 1, process air leaving the sorbent matrix 30 is represented by numeral 3, purge air leaving the sorbent matrix 30 is represented by numeral 2, regeneration air entering the sorbent matrix 30 is represented by numeral 4, and regeneration air leaving the sorbent matrix 30 is represented by numeral 5. Given the flow arrangement of FIG. 14 and the pressure and leakage values in FIGS. 12 and 13, air will leak from the process inlet to the regeneration outlet, and from the regeneration inlet to the process outlet. With the given curves, and the given application, for matrix 3 media approximately 1.4 scfm of regeneration inlet air will leak to the process outlet and 3.5 scfm will leak to the regeneration circuit from the process circuit. This leakage will increase the process outlet humidity ratio from 1.45 to 1.65 gr/lb. and reduce the regeneration outlet humidity ratio from 186 gr/lb to 184 gr/lb.

The leaving dew point performance on the process side has not been reduced significantly but cross-circuit leakage has significantly reduced the amount of water available for removal through condensation, in this case by up to 5%. Application of a closed isolation loop rather than the open-purge arrangement depicted in FIG. 14 would recollect this moisture, as well as reduce the cross-circuit pressure differences.

Figure 16:
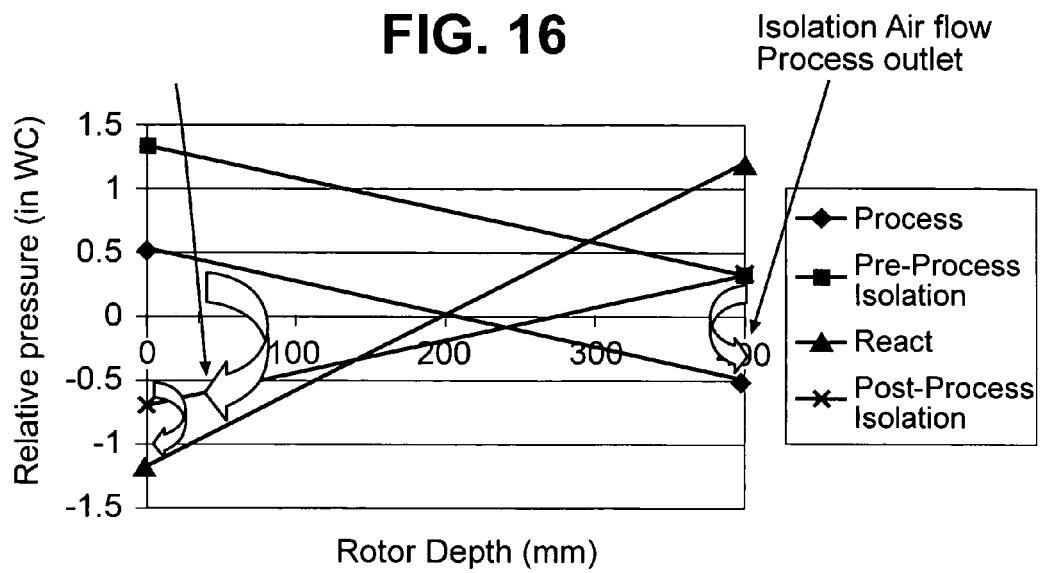
FIG. 16 is a graph plotting pressure drop as a function of rotor depth for the system shown in FIG. 15.

A four-zone system including an isolation loop is shown in FIG. 15, in which process air entering the sorbent matrix 30 is represented by numeral 1, process air exiting the sorbent matrix 30 is represented by numeral 3, isolation air on the process-air-leaving side of the sorbent matrix 30 is represented by numeral 2, isolation air on the process-air-entering side of the sorbent matrix 30 is represented by numerals 2a and 2b, regeneration air entering the sorbent matrix 30 is represented by numeral 4, and regeneration air exiting the sorbent matrix is represented by numeral 5. FIG. 16 shows the relative pressures to which the isolation loop will equilibrate. Graphically it is quite easy to understand the effect that the isolation loop has had on performance reducing cross circuit leakage. The smaller "leakage arrows" reflect the lower leakage rates. Additionally, the effect of the leakage is reduced as the isolation zones do not have the same extremes of humidity and thus have a greatly reduced influence on dilution of regeneration and contamination of process outlets. Preferably, isolation loops are added until the permeation of one fluid stream through the sorbent material into an adjacent fluid stream affects the sorbate concentration of one or both of the adjacent fluid streams by less than approximately 15%, more preferably by less than approximately 10%.

It should be noted that this example parallels the example of a VOC concentrator. Small changes in removal efficiency result in large reductions in VOC concentration ratios. The isolation loop acts in the same fashion, significantly improving the concentration ratio of such systems.

Reduction of Vapor "Sinks"

Further enhancements may be made to the performance of these systems by incorporating differing diameters for the various zones of the sorbent absorbent disk. As noted above, edge effects may have a detrimental effect on the removal efficiency of the sorptive disk. Typically this effect is the result of incomplete regeneration of the sorptive media at the center and/or edges of the disk, or incomplete purging or cooling of these areas. When face seals are utilized there also exists a vapor sink that can fill while adjacent to the regeneration zone, and empty into the treated air of the process stream. When circumferential seals are used to seal against the rim of the disk, rather than on the face, the mass of the housing can act as a heat sink, preventing full regeneration of the very outer desiccant material.

To combat these effects, the regeneration zone and any isolation zone(s) should extend radially outward toward the periphery of the sorbent disk to a greater extent than the process zone. Preferably, the isolation zone(s) should also extend radially outward to a greater extent than the regeneration zone.

Figure 17:
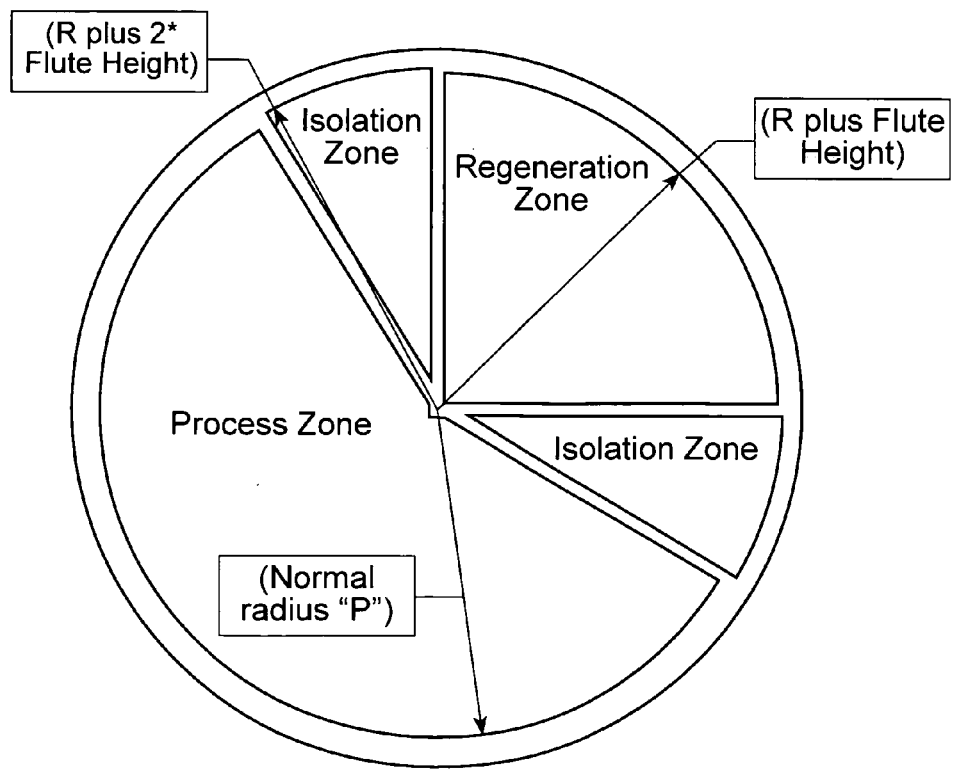
FIG. 17 is a schematic illustration of a preferred configuration of a four-zone rotary bed sorption system in accordance with the invention.

In the preferred embodiment illustrated in FIG. 17, the diameter of the regeneration zone is larger by at least one disk pore diameter, i.e., flute height, than the diameter of the process zone to ensure that regeneration of the peripheral edges of the sorbent disk is complete. The diameter of the isolation zones is one pore size larger that of the regeneration zone. In the case where rim seals are used on the perimeter, a face seal should be provided to prevent air flow through the very outer edge of the disk in the process sector.

The embodiments discussed above are representative of preferred embodiments of the present invention and are provided for illustrative purposes only. They are not intended to limit the scope of the invention. Although specific configurations, structures, conditions, etc., have been shown and described, such are not limiting. Modifications and variations are contemplated within the scope of the present invention, which is intended to be limited only by the scope of the accompanying claims.

We claim:

1. A method of reducing the sorbate concentration of a process fluid stream using a sorption bed system comprising a rotating mass of a regenerable sorbent material, the method comprising the steps of:
   rotating the sorbent mass so that, in a cycle of operation, a given volume of the sorbent mass sequentially passes through first, second, third, fourth, fifth, and sixth zones, before returning to the first zone;
   passing a process fluid stream through the sorbent mass in the first zone;
   passing a regeneration fluid stream through the sorbent mass in the fourth zone;
   recycling a first isolation fluid stream in a closed loop, independent of the process fluid stream and the regeneration fluid stream, between the sorbent mass in the second zone and in the sixth zone; and
   recycling a second isolation fluid stream in a closed loop, independent of the process fluid stream, the regeneration fluid stream, and the first isolation fluid stream, between the sorbent mass in the third zone and in the fifth zone.

2. The method of claim 1, wherein the direction of fluid flow in each of the first, fifth, and sixth zones is the same.

3. The method of claim 2, wherein the direction of fluid flow in each of the second, third, and fourth zones is the same.

4. The method of claim 3, wherein the direction of fluid flow in each of the first, fifth, and sixth zones is opposite the direction of fluid flow in each of the second, third, and fourth zones.

5. The method of claim 1, wherein a concentration of at least one member selected from the group consisting of water vapor, volatile organic compounds, and nitrous oxides is reduced as a result of passing the process fluid stream through the sorbent mass in the first zone.

6. The method of claim 1, further comprising the steps of:
recirculating the regeneration fluid stream in a closed loop;
cooling the regeneration fluid stream to condense vapor out of the regeneration fluid stream; and
reheating the cooled regeneration fluid stream prior to passing the regeneration fluid stream through the fourth zone.

7. The method of claim 1, further comprising the step of recirculating the process fluid stream in a substantially closed loop to dehydrate or maintain dry a product.

8. A rotary sorption bed system, comprising:
a process fluid stream;
a regeneration fluid stream;
a first isolation fluid stream that recirculates in a closed loop independent of the process fluid stream and the regeneration fluid stream;
a second isolation fluid stream that recirculates in a closed loop independent of the process fluid stream, the regeneration fluid stream, and the first isolation fluid stream; and
a rotating mass of a regenerable sorbent material through which each of the process fluid stream, the regeneration fluid stream, the first isolation fluid stream, and the second isolation fluid stream is passed,
wherein, in a cycle of operation, a given volume of the sorbent mass sequentially passes through the process fluid stream, the first isolation fluid stream, the second isolation fluid stream, the regeneration fluid stream, the second isolation fluid stream, and the first isolation fluid stream, before returning to the process fluid stream.

9. The system of claim 8, wherein the process fluid stream and the regeneration fluid stream are passed through the sorbent mass in opposite directions, and each of the first isolation fluid stream and the second isolation fluid stream is passed through the sorbent mass in the same direction as the fluid stream immediately following the respective first or second isolation fluid stream in the direction of rotation of the sorbent mass.

10. The system of claim 8, further comprising a third isolation fluid stream that recirculates in a closed loop independent of the process fluid stream, the regeneration fluid stream, the first isolation fluid stream, and the second isolation fluid stream, the third isolation fluid stream being arranged such that the given volume of the sorbent mass sequentially passes through the process fluid stream, the first isolation fluid stream, the second isolation fluid stream, the third isolation fluid stream, the regeneration fluid stream, the third isolation fluid stream, the second isolation fluid stream, and the first isolation fluid stream, before returning to the process fluid stream.

11. The system of claim 10, wherein the process fluid stream and the regeneration fluid stream are passed through the sorbent mass in opposite directions, and each of the first isolation fluid stream, the second isolation fluid stream, and the third isolation fluid stream is passed through the sorbent mass in the same direction as the fluid stream immediately following the respective first, second, or third isolation fluid stream in the direction of rotation of the sorbent mass.

12. The system of claim 8, wherein the process fluid stream is at a higher pressure than the regeneration fluid stream.

13. The system of claim 8, wherein the process fluid stream is at a lower pressure than the regeneration fluid stream.

14. The system of claim 8, wherein the sorbent mass has a permeability of greater than 0.5 scfm/ft$^2$"WC.

15. The system of claim 8, wherein one of the fluid streams is at a temperature of below freezing, and an adjacent fluid stream has a dew point that is higher than that of the below-freezing fluid stream.

16. The system of claim 8, wherein the regeneration fluid stream has a water vapor level above approximately 80 gpp, and the process fluid stream, after passing through the sorbent mass, has a dew point of less than approximately −30° F.

17. A method of designing a sorption bed system in which a mass of a regenerable sorbent material is rotated so that a given volume of the sorbent mass alternately passes through a process fluid stream and a regeneration fluid stream, the method comprising the steps of:
(a) determining whether at least one criterion selected from the following is satisfied:
(I) the temperature of one fluid stream is less than or equal to the dew point of an adjacent fluid stream;
(ii) there is a difference in vapor pressure of at least about 150 Pa between zones of the sorbent material through which adjacent fluid streams pass;
(iii) the difference in absolute pressure between adjacent fluid streams exceeds a design pressure of a sealing structure of the sorption bed system; and
(iv) permeation of one fluid stream through the sorbent material into the adjacent fluid stream affects the sorbate-concentration of one or both of the adjacent fluid streams by at least 10%;
(b) if it is determined in step (a) that the at least one criterion is satisfied, adding to the system an isolation fluid stream that recirculates in a closed loop independent of the other fluid streams, the isolation fluid stream being arranged such that, in a cycle of operation, the given volume of the sorbent mass passes through the isolation fluid stream twice, once before the process fluid stream and after the regeneration fluid stream, and once after the process fluid stream and before the regeneration fluid stream; and
(c) repeating steps (a) and (b) until it is determined in step (b) that the at least one criterion is not satisfied.

18. The method of claim 17, wherein, in step (a), it is determined whether each of criterion (I), (ii), (iii), and (iv) is satisfied, and in step (b), an isolation fluid stream is added if any of criterion (I), (ii), (iii), and (iv) is satisfied.

19. The method of claim 17, wherein, in step (b), it is determined whether a plurality of criterion selected from (I), (ii), (iii), and (iv) is satisfied, and in step (b), an isolation fluid stream is added if any of the plurality of selected criterion is satisfied.

20. The method of claim 17, wherein, in step (b), the isolation fluid stream is arranged such that, in a cycle of operation, the given volume of the sorbent mass passes through the isolation fluid stream twice, once immediately before the process fluid stream, and once immediately after the process fluid stream.

21. The method of claim 17, wherein, in step (b), the isolation fluid stream is arranged such that, in a cycle of operation, the given volume of the sorbent mass passes through the isolation fluid stream twice, once immediately before the regeneration fluid stream, and once immediately after the regeneration fluid stream.

22. A rotary sorption bed system, comprising a rotating disk of a sorbent material that, in a cycle of operation, passes through a plurality of zones including a process zone, a regeneration zone, and at least one isolation zone, wherein the regeneration zone and the at least one isolation zone each extend radially outward toward the periphery of the sorbent disk to a greater extent than the process zone.

23. The system of claim 22, wherein the at least one isolation zone extends radially outward toward the periphery of the sorbent disk to a greater extent than the regeneration zone.

24. The system of claim 23, wherein the regeneration zone extends radially outward toward the periphery of the sorbent disk by at least one flute height more than the process zone, and the at least one isolation zone extends radially outward toward the periphery of the sorbent disk by at least one flute height more than the regeneration zone.

25. The system of claim 23, wherein the sorbent material, in a cycle of operation, passes through a plurality of isolation zones, and each isolation zone extends radially outward toward the periphery of the sorbent disk to a greater extent than both the process zone and the regeneration zone.

26. The system of claim 25, wherein the regeneration zone extends radially outward toward the periphery of the sorbent disk by at least one flute height more than the process zone, and each isolation zone extends radially outward toward the periphery of the sorbent disk by at least one flute height more than the regeneration zone.

27. The system of claim 25, wherein the plurality of isolation zones corresponds to one or more closed isolation loops.

28. A method of improving the performance of a rotary bed sorption system, the method comprising the steps of:
  rotating a mass of a regenerable sorbent material so that, in a cycle of operation, a given volume of the sorbent mass sequentially passes through first, second, third, and fourth zones, before returning to the first zone;
  passing a process fluid stream through the first zone in a first direction;
  passing a regeneration fluid stream through the third zone in a second direction that is opposite the first direction; and
  reducing cross-contamination between the process fluid stream and the regeneration fluid stream by recycling at least one isolation fluid stream between the sorbent mass in the second zone, where the isolation fluid stream passes through the sorbent mass in the second direction, and in the fourth zone, where the isolation fluid stream passes through the sorbent mass in the first direction.

* * * * *